United States Patent
Haefeli et al.

(10) Patent No.: US 8,153,913 B2
(45) Date of Patent: Apr. 10, 2012

(54) ENCAPSULATED WEIGHING CELL WITH ECCENTRIC LOAD ERROR ADJUSTMENT

(75) Inventors: Roman Haefeli, Zetzwil (CH);
Jean-Christophe Emery, Zürich (CH);
Hans-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 355 days.

(21) Appl. No.: 12/427,855

(22) Filed: Apr. 22, 2009

(65) Prior Publication Data

US 2009/0283337 A1    Nov. 19, 2009

(30) Foreign Application Priority Data

May 15, 2008    (EP) ..................................... 08156249

(51) Int. Cl.
*G01G 21/00* (2006.01)
*G01G 23/01* (2006.01)
*G01G 21/24* (2006.01)
*G01G 21/30* (2006.01)

(52) U.S. Cl. ...... 177/229; 73/1.13; 73/1.15; 73/862.633
(58) Field of Classification Search .................... 73/1.13, 73/1.15, 862.633; 177/50, 211, 299
See application file for complete search history.

(56) References Cited

U.S. PATENT DOCUMENTS

| | | | |
|---|---|---|---|
| 4,196,784 A * | 4/1980 | Suzuki et al. .................. | 177/211 |
| 4,343,197 A * | 8/1982 | Suzuki et al. ............ | 73/862.633 |
| 4,362,218 A * | 12/1982 | Shoberg ........................ | 177/154 |
| 4,485,881 A | 12/1984 | Tramposch et al. | |
| 4,606,421 A | 8/1986 | Schroeder | |
| 4,815,547 A * | 3/1989 | Dillon et al. ................ | 177/25.14 |
| 4,957,177 A | 9/1990 | Hamilton et al. | |
| 5,895,894 A * | 4/1999 | Zumbach ....................... | 177/180 |
| 6,326,562 B1 | 12/2001 | Burkhard et al. | |
| 6,789,435 B2 * | 9/2004 | Hopkins ................... | 73/862.632 |
| 7,851,713 B2 * | 12/2010 | Burkhard et al. ...... | 177/210 EM |

FOREIGN PATENT DOCUMENTS

| | | | | |
|---|---|---|---|---|
| EP | 399466 A2 * | 11/1990 | ............... | 73/862.633 |
| EP | 0587420 A1 | 3/1994 | | |
| JP | 55-39043 A * | 3/1980 | | |
| JP | 60-227140 A * | 11/1985 | ................. | 73/862.67 |
| JP | 2002-365125 A | 12/2002 | | |
| JP | 2003-21554 A | 1/2003 | | |
| JP | 2009-276350 A * | 11/2009 | | |
| WO | 2005/031286 A1 | 4/2005 | | |

* cited by examiner

*Primary Examiner* — Randy W Gibson
(74) *Attorney, Agent, or Firm* — Standley Law Group LLP

(57) ABSTRACT

A gravimetric measuring instrument has a weighing cell and a flexible, tubular-shaped encapsulation. The weighing cell has a parallel-guiding mechanism and at least one measurement transducer. The ends of the encapsulation are attached, respectively, to the stationary parallelogram leg and the movable parallelogram leg, so that at least the parallel-guiding mechanism and the measurement transducer are enclosed by the encapsulation, protecting them from dirt and humidity. In some aspects, the parallel-guiding mechanism has an adjustment region formed at one of the parallelogram legs which allows adjustment of the distance between at least one flexure pivot of the upper parallel-guiding member and a flexure pivot of the lower parallel-guiding member. This adjustment region is mechanically connected to at least one adjustment-setting area, which is arranged outside the encapsulation and allows changes to be made to the adjustment region.

18 Claims, 6 Drawing Sheets

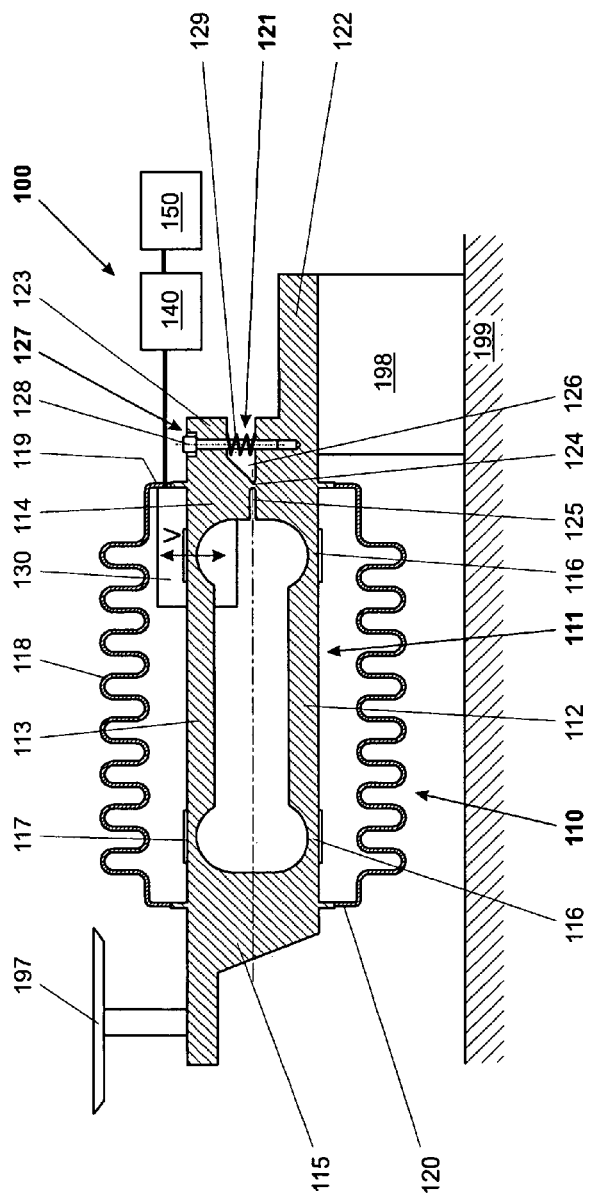
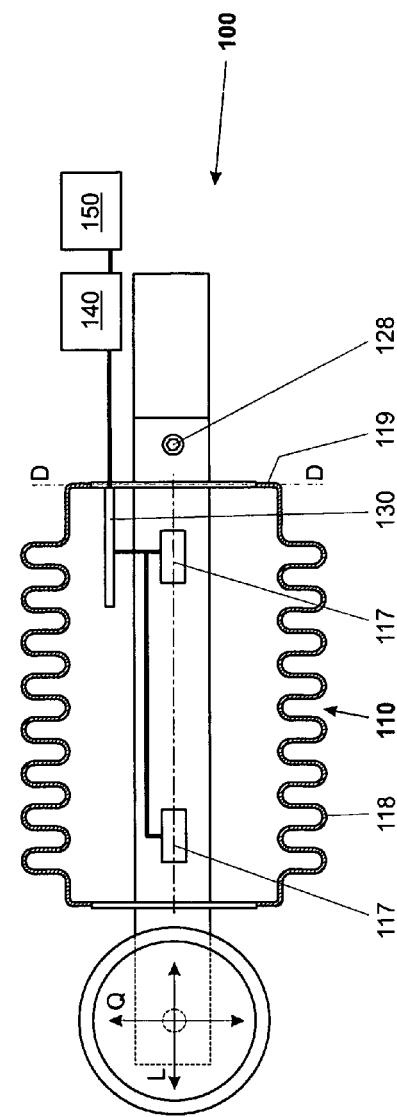
Fig. 1A
Fig. 1B

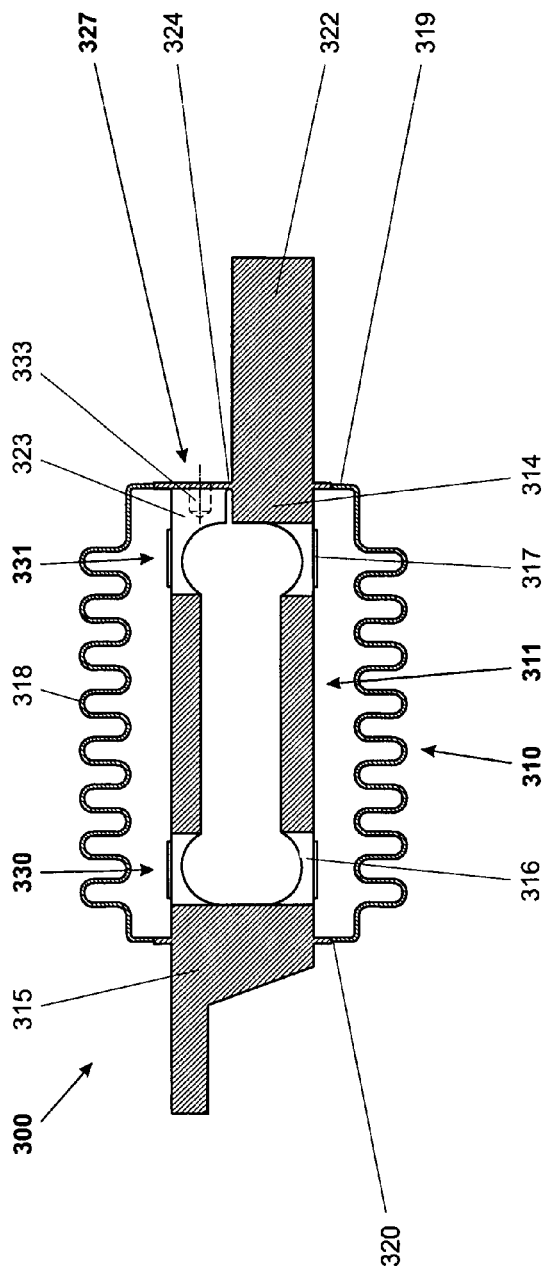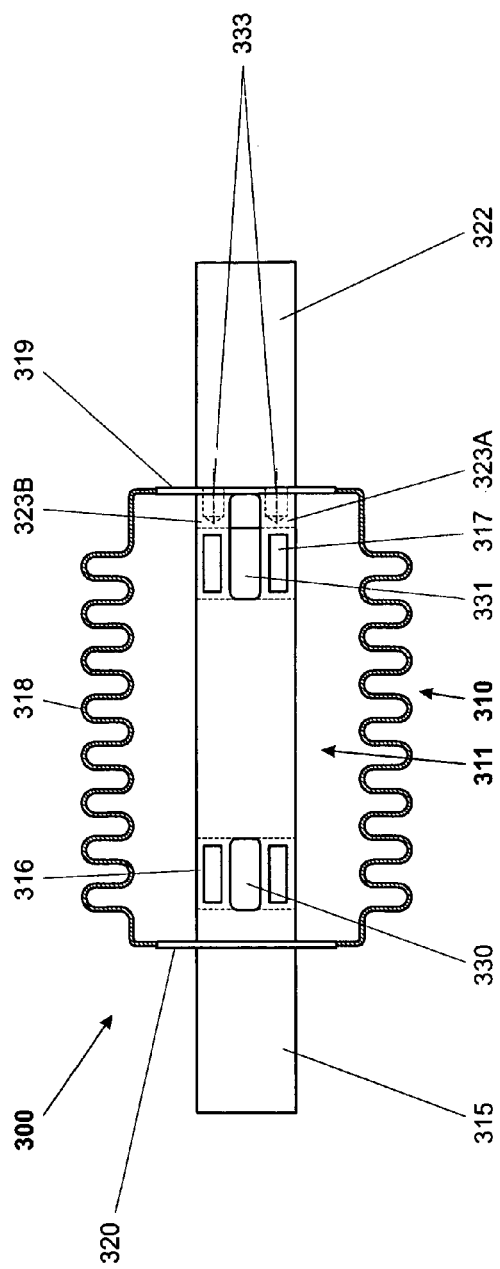

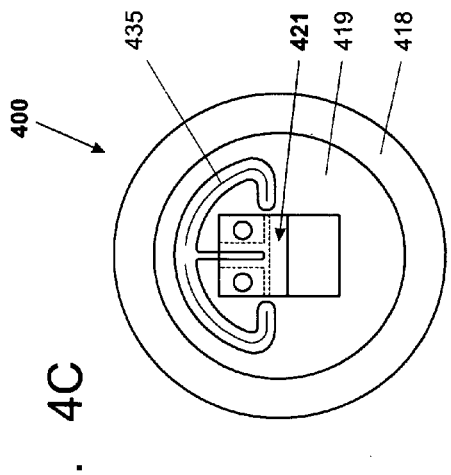
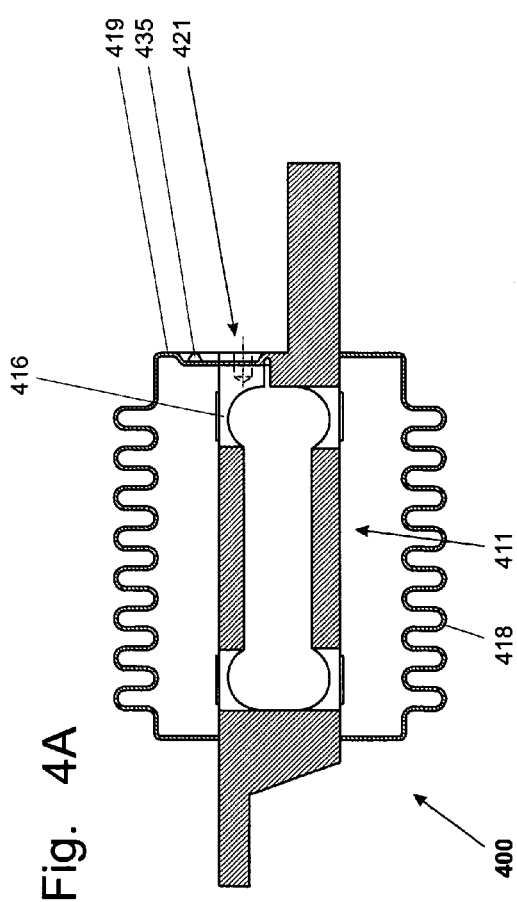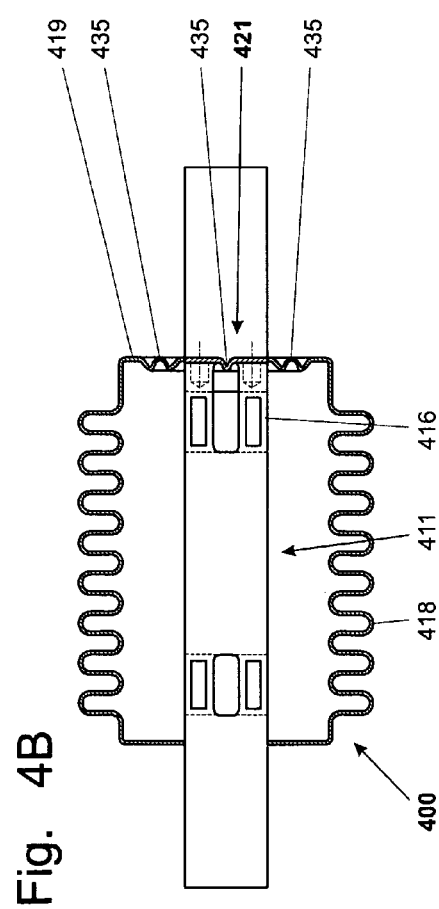

ENCAPSULATED WEIGHING CELL WITH ECCENTRIC LOAD ERROR ADJUSTMENT

CROSS-REFERENCE TO RELATED APPLICATION

This application claims a right of priority under 35 USC §119 from European patent application 08 15 6249.8, filed 15 May 2008, the content of which is incorporated by reference as if fully recited herein.

TECHNICAL FIELD

The present invention relates to a gravimetric measuring instrument, in particular an encapsulated weighing cell.

BACKGROUND OF THE ART

Many gravimetric measuring instruments have a parallel-guiding mechanism. A parallel-guiding mechanism includes at least one stationary and one movable parallelogram leg as well as at least one upper and one lower parallel-guiding member. A weighing pan which is supported and guided in vertical movement by the movable parallelogram leg receives the weighing load, wherein the force exerted by the load on the weighing pan is transmitted either directly or through a force-reducing lever mechanism to a measurement transducer. The parallel-guiding mechanism, the force-transmitting system and the measurement transducer constitute in essence the weighing cell of a gravimetric measuring instrument. The current state of the art includes a variety of operating principles of weighing cells such as for example weighing cells with strain gauges, weighing cells with oscillating strings, or weighing cells with electromagnetic force compensation (EMFC).

In EMFC weighing cells, the weight of the load is transmitted either directly or through one or more force-transmitting levers to an electromechanical measurement transducer which produces an electrical signal that is representative of the weighing load and is further processed and visually displayed by an electronic weight-processing system.

In weighing cells with strain transducers, an elastically deformable body is equipped with strain gauges. The deformable body changes its shape elastically under the applied load. The deformable body is in many cases configured as a parallelogram-shaped measuring element, specifically as a parallel-guiding mechanism with specially shaped bending zones, whereby defined deformation zones are established. The strain gauges are arranged in the areas of these deformation zones or bending zones. As a result of the shape change of the deformable body due to a load on the movable parallelogram leg, the strain gauges are subjected to a state of tension or compression, which causes a change of the electrical resistance of the strain gauges in comparison to a load-free state of the movable parallelogram leg, wherein the resistance change represents a measure for the magnitude of the applied load.

In string-oscillator weighing cells, the overall mechanical configuration is largely analogous to the EMFC- and strain gauge weighing cell, with the difference that an oscillating string transducer is used in place of the electromagnetic transducer. The weighing load affects the tensile force in an oscillating string whose frequency change, in turn, represents a measure for the applied load.

One characteristic trait of the weighing cells of the foregoing description, which all gravimetric measuring instruments with a weighing pan constrained by a parallel-guiding mechanism have in common, is the property that the weight force transmitted from the weighing pan to the transducer generally shows a slight dependency on whether the weighing load is placed on the center of the weighing pan or off-centered towards the edge. This can have the undesirable consequence that a gravimetric measuring instrument, i.e. a balance, indicates a different amount of weight for one and the same weighing load, depending on where the load was placed on the weighing pan. These deviations which occur when the weighing load is placed eccentrically on the weighing pan are commonly called eccentric load errors (or also as shift errors or corner load errors).

In a parallelogram-shaped measuring element or parallel-guiding mechanism, i.e. a mechanism which guides the weighing pan support in a parallel movement by means of two parallel-guiding members which are parallel to each other and essentially horizontal, eccentric load errors occur primarily due to the fact that the parallel-guiding members deviate slightly from the ideal, absolutely parallel alignment. The relative magnitude of the eccentric load error, i.e. the ratio between the observed weighing error and the size of the test weight being used, approximately corresponds to the relative geometrical deviation which caused the eccentric load error. A distinction is made between an eccentric load error in the lengthwise direction and an eccentric load error in the transverse direction of the parallel-guiding mechanism, in accordance with the direction in which the test weight is moved on the weighing pan in an eccentric load test of the balance. An eccentric load error in the lengthwise direction occurs if the vertical distance between the parallel-guiding members at the end which is connected to the stationary parallelogram leg is not exactly equal to the distance at the opposite end which is connected to the movable parallelogram leg. An eccentric load error in the transverse direction, on the other hand, occurs if the two parallel-guiding members are slightly twisted relative to each other, i.e. if the distance between the parallel-guiding members varies over the width of the parallel-guiding members.

In state-of-the-art references, for example U.S. Pat. No. 6,326,562, which is commonly-owned, as well as in JP 2002 365125 A and WO 2005/031286, parallel-guiding mechanisms of weighing cells are disclosed which include a device for adjusting the eccentric load error. The adjustment mechanism in these weighing cells follows a design concept in which the stationary parallelogram leg has at least one deformation zone between the areas of attachment of the parallel-guiding members, wherein the deformation zone is configured in such a way that a tilt axis is defined whose orientation is orthogonal to the lengthwise direction of the parallel-guiding mechanism. By tilting the areas of attachment against each other by means of an adjustment screw, the end of the upper parallel-guiding member that is connected to the stationary parallelogram leg can be raised as well as lowered. This allows the eccentric load error in the lengthwise direction to be corrected. Depending on the design of the adjustment mechanism, the inclination angle of the tilt axis, i.e. the transverse inclination of the area of attachment, could likewise be adjustable, which would allow the eccentric load errors to be adjusted for the transverse direction of the weighing cell.

Eccentric load error adjustments can be made as long as the parallel-guiding mechanism of the weighing cell is freely accessible. However, if the weighing cell is enclosed in an encapsulation which cannot be reopened, as disclosed in commonly-owned U.S. Pat. Nos. 5,895,894 or 4,957,177, an eccentric load error adjustment is no longer possible. As an additional problem, which is described in detail in U.S. Pat. No. 4,957,177, the encapsulation itself in the form of a bellows can have an influence on the eccentric load accuracy or eccentric load error. As a result of this, mechanically identical encapsulated weighing cells will differ from each other in their eccentric load errors even if their parallel-guiding mechanisms were adjusted prior to installing the encapsulation. The only possibility left is to compensate for these variations through the expensive measure of a signal-processing unit connected to the transducer.

Consequently, the present disclosed embodiments has the objective to create a gravimetric measuring instrument with an encapsulated weighing cell which is free of the drawbacks regarding the eccentric load accuracy which have been described above.

SUMMARY

This objective is met by a gravimetric measuring instrument according to the appended claims.

A gravimetric measuring instrument comprises a weighing cell and a flexible, tubular-shaped encapsulation. The weighing cell comprises a parallel-guiding mechanism and at least one measurement transducer. The parallel-guiding mechanism includes a movable parallelogram leg which is guided in vertical movement and connected to a stationary parallelogram leg by two parallel-guiding members, wherein flexure pivots are formed or arranged at the joints between the parallel-guiding members and the parallelogram legs. One end of the tubular-shaped encapsulation is attached to the stationary parallelogram leg, and the other end of the tubular-shaped encapsulation is attached to the movable parallelogram leg, so that at least the parallel-guiding mechanism and the measurement transducer are enclosed by the encapsulation and therefore protected against dirt and humidity from the outside of the encapsulation or from the environment of the gravimetric measuring instrument. Accordingly, the encapsulation has a hermetically sealed interior space in which the measurement transducer and the parallel-guiding members are arranged.

The at least one measurement transducer is connected to a signal-processing unit which can be arranged inside the encapsulation as well as outside the encapsulation. To make the encapsulated weighing cell more widely interchangeable, one could also arrange only a part of the signal-processing elements, for example a circuit module, in the interior of the encapsulation. This circuit module includes for example only a memory module and a converter circuit for the conversion of the analog signals delivered by the at least on measurement transducer. The memory module and the converter circuit can be connected by way of connecting leads to a processor unit which belongs to the gravimetric measuring instrument and is arranged outside the encapsulation. With this arrangement, the heat dissipated by a processor of the processor unit can be kept outside the narrowly confined interior space which is hermetically sealed by the encapsulation. Thus, a temperature rise in the interior space is largely avoided. Further, the memory module serves to store compensation data which can be called up by the processor unit and through which the converted raw signal of the weighing cell can be corrected. These compensation data are data which are specific to each individual weighing cell, which vary from one cell to the next due to manufacturing tolerances, and which are determined for each weighing cell during the final inspection at the factory. Due to this design concept, an encapsulated weighing cell can be exchanged without a problem, without the need to readjust the entire gravimetric measuring instrument. In some cases, the gravimetric measuring instrument may also include an input unit and/or an indicator unit.

According to the disclosed embodiments, the gravimetric measuring instrument of the foregoing description has a parallel-guiding mechanism with an adjustment region formed at its movable parallelogram leg and/or at its stationary parallelogram leg, wherein the adjustment region allows the distance between at least one flexure pivot of the upper parallel-guiding member and a flexure pivot of the lower parallel-guiding member to be adjusted. This adjustment region is mechanically connected to at least one adjustment-setting area which is arranged outside the encapsulation and allows changes to be made to the adjustment region.

Based on this design concept, the eccentric load error can be adjusted in a parallel-guiding mechanism which is enclosed by an encapsulation and thus not directly accessible. This disclosed embodiments has the special advantage that the mechanical influence which the encapsulation has on the eccentric load accuracy can also be included in the adjustment, such as for example the influence of asymmetrically distributed reaction forces which occur as a result of the displacement of the movable parallelogram leg. Even if there is a change in the influence that a plastic deformation of the encapsulation has on the eccentric load error, the eccentric load error can be readjusted.

The adjustment region can have a variety of configurations. As an example, the adjustment region can have at least one deformation zone formed by at least one cutout which horizontally traverses the movable or the stationary parallelogram leg. By applying a force or a torque, the adjustment region can be tilted about a pivot axis which is defined by the deformation zone and oriented in the transverse direction of the parallel-guiding mechanism. As a result of the tilting of the adjustment region, the end of one of the parallel-guiding members which terminates in the adjustment region undergoes a permanent displacement in the vertical direction. With this displacement in the vertical direction, the distances between the upper and lower flexure pivots at the two parallelogram legs, more specifically the distances between the respective pivoting axes, are made precisely equal to each other, whereby an eccentric load error in the lengthwise direction of the parallel-guiding mechanism can essentially be corrected.

Within the context of the present description, expressions such as "upper", "lower", "horizontal", "vertical" and the like always refer to the orientation of the parallel-guiding mechanism in its normal operating state, i.e. to the direction of gravity.

Although the deformation zone is formed by cutouts, this does not mean that the deformation zone would necessarily have to be carved monolithically out of the stationary and/or the movable parallelogram leg. The deformation zone as well as the parallelogram legs can also consist of a plurality of assembled components. However, in order to avoid problems with temperature-related stresses in the parallel-guiding mechanism due to the use of different materials, the parallelogram legs are preferably of a monolithic configuration with cutouts, and thus with at least one deformation zone, produced by milling, sawing, planing, drilling, lathe turning, cutting, eroding, or other work methods.

Accordingly, the cutouts forming the adjustment region reduce the cross-sectional area of the material in at least one suitable location of the stationary parallelogram leg and/or the movable parallelogram leg. "A suitable location" means that the parallel-guiding members can be adjusted in relation to each other, for example that the at least one cutout is arranged between the upper parallel-guiding member and the lower parallel-guiding member.

The parallelogram leg includes all parts that serve to connect the upper and lower parallel-guiding member, so that the parallel-guiding members are held in a fixed relationship to each other, more specifically at a fixed distance from each other.

In a special embodiment of the parallel-guiding mechanism, the deformation zone can be subjected to a controlled plastic deformation by applying an adjusting force or an adjusting torque to the adjustment-setting area. With the plastic deformation of the at least one deformation zone, it is possible to achieve a targeted permanent position adjustment of the parallel-guiding members in relation to each other. Consequently, the adjustment of the eccentric load error remains preserved even without securing the adjustment region with fixation elements such as screws, wedges, plates and the like. However, it is preferable to provide a fixation because, depending on the design of the encapsulated weighing cells, impact forces against the encapsulation could knock the parallel-guiding system out of adjustment.

In a preferred further development of the first embodiment, the adjustment region is split by a further cut at the vertically adjustable end of the parallel-guiding member which terminates in the adjustment region, wherein the cut runs in the vertical lengthwise median plane of the movable parallelogram leg or the stationary parallelogram leg and extends up to the flexure pivot. The flexure pivot itself, however, is not divided. As a result of the further cut, two separate adjustment regions with separate zones of deformation are formed adjacent to each other, so that:

on the one hand, by applying parallel forces or torques and thereby imparting parallel tilt displacements to the two adjacent separate adjustment regions, a permanent parallel vertical adjustment of the elastic flexure pivot can be effected, whereby an eccentric load error in the lengthwise direction of the parallel-guiding mechanism can be corrected, and on the other hand, by applying anti-parallel forces or torques and thereby imparting opposite transverse tilt displacements to the adjustment regions, a permanent twisting distortion of the adjustable end of the parallel-guiding member can be effected, whereby an eccentric load error in the transverse direction of the parallel-guiding mechanism can be corrected.

This design is particularly suitable for parallelogram-shaped measuring elements with strain gauges in the areas of the flexure pivots.

It is a generally valid statement that parallel adjustments, i.e. adjustments of equal magnitude and equal direction, of the two adjustment regions will affect primarily the eccentric load error in the lengthwise direction of the parallel-guiding mechanism, while anti-parallel adjustments, i.e. adjustments of equal magnitude but opposite direction, will affect primarily the eccentric load error in the transverse direction of the parallel-guiding mechanism. However, there can be some cross-over effect between the two directions, so that a parallel adjustment can also affect to a minor extent the eccentric load error in the transverse direction and an anti-parallel adjustment can also affect to a minor extent the eccentric load error in the lengthwise direction.

As an additional measure to facilitate a twisting deformation of the parallel-guiding member and as a preferred solution in parallel-guiding mechanisms for high-resolution gravimetric measuring instruments, the flexure pivot at the vertically adjustable end of the parallel-guiding member which terminates in the adjustment region is split by continuing the further cut up to the parallel-guiding member, whereby the flexure pivot is divided in two like the adjustment region. However, the flexure pivot can also be divided by means of a perforation into two separate flexure pivots lying side-by-side, and the further cut can run into this perforation.

The simplest way of connecting the adjustment region with the adjustment-setting area is for example to arrange at least two lever arms between these areas. The adjustment-setting area includes in this case the lever sections which protrude from the encapsulation. One of these lever arms can include a connector for a weighing pan or a mounting area that connects to a supporting structure. At the other lever arm or between the lever arms, there can be at least one hole where an adjustment tool can be inserted, or at least one suitable surface formation for the engagement of a screw driver or a wrench, an adjustment screw, an adjustment tool, or an adjusting wedge. Regardless of whether the adjustment region is formed on the stationary or the movable parallelogram leg, one of the levers always serves for the introduction of a force or a torque and an associated displacement into the adjustment zone, while the other of the two levers always serves to take up the reaction of this force or torque and thus to hold one part of the adjustment region in a fixed position. Only in this way is it possible to change the adjustment region, i.e. to tilt the upper part of the adjustment region in relation to the lower part of the adjustment region, inside the encapsulation.

According to the disclosed embodiments, both levers pass through the wall of the encapsulation. To allow a pivotal movement of the levers relative to each other, the wall needs to have a certain degree of elasticity at least in the area of one of the levers, as it would otherwise be impossible to change the angle between the levers. If the encapsulation is made of rubber or of a suitable soft elastic synthetic material, its inherent elasticity will be sufficient to allow the levers to pivot in relation to each other, whereby the encapsulation will be slightly distorted.

If the encapsulation is made for example of stainless steel, it will be necessary to select an appropriate design to allow a pivotal movement between the levers.

The encapsulation preferably has a tubular-shaped mid-portion, a first end portion and a second end portion, with a gas-tight connection between the end portions and the tubular-shaped mid-portion. To allow a displacement of the movable parallelogram leg without adverse interference by the encapsulation (elastic spring properties of the encapsulation), the encapsulation preferably has a mid-portion configured as a bellows. The first end portion is connected gas-tight to the movable parallelogram leg, and the second end portion is connected gas-tight to the stationary parallelogram leg. As the two end portions are thin flat plates, they can be easily distorted, in particular bent and warped.

To minimize the distortion of the encapsulation which occurs as a consequence of adjusting the eccentric load error, the deformation zone can be arranged in a plane containing the end portion of the encapsulation. Undesirable stresses in the encapsulation can thereby be kept to a minimum, as the end portion is only being bent, rather than being bent and compressed at the same time.

Undesirable stresses in the encapsulation will occur to an even lesser extent if the end portion includes at least one flexible corrugation. With this flexible corrugation, the area of deformation is on the one hand locally delimited while on the other hand, with a suitable design of the flexible corrugation, the material stresses which the adjustment causes in the housing are reduced to a minimum.

Although it is certainly possible to realize the foregoing embodiments in practice, they have a high manufacturing cost. For example, each lever by itself has to be connected to the housing at the passage of the lever through the housing in order for the interior space of the encapsulation to be tightly sealed. Furthermore, impressing the flexible corrugations on the encapsulation entails in most cases additional labor. In addition, the stresses remaining in the encapsulation can also affect the accuracy of the measurement result of the gravimetric measuring instrument and can change over time.

To avoid this problem, one should preferably aim for solutions which require no sharp bending, compressing, stretching or warping of the encapsulation in order to make a change in the adjustment region. In a further embodiment, the adjustment region therefore includes at least one knee lever. The two knee lever members are at one end pivotally connected to each other through a knee joint, while their other ends are located near the flexure pivots and pivotally connected to the parallelogram leg that includes the adjustment region. Further, the adjustment-setting area which is arranged outside of the encapsulation is connected through a transmitting element to the knee joint. With the adjustment-setting area and the transmitting element, the position of the knee joint relative to the movable parallelogram leg can be changed, so that by means of the knee lever, the distance between a flexure pivot of the upper parallel-guiding member and a flexure pivot of the lower parallel-guiding member can be changed and adjusted by spreading or contracting the adjustment region.

To facilitate the adjustment process, the distance between the flexure pivots of one of the parallelogram legs in the non-adjusted state can be larger than the distance between the flexure pivots of the other parallelogram leg. While this makes it necessary to always perform an adjustment, it has the advantage that the adjustment region only needs to be displaced in one direction and the adjustment-setting area therefore needs to be moved only in one direction.

BRIEF DESCRIPTION OF THE DRAWINGS

Details of the parallel-guiding mechanism are explained more specifically hereinafter by referring to the drawings according to the following overview:

FIG. 1A is a side sectional view of a gravimetric measuring instrument, in a first embodiment with an adjustment region which allows an eccentric load error adjustment only in the lengthwise direction;

FIG. 1B is a top sectional view of the FIG. 1A instrument;

FIG. 3A is a side sectional view of a third embodiment of the instrument, wherein the adjustment-setting area is formed in the encapsulation;

FIG. 3B is a top sectional view of the FIG. 3A instrument;

FIG. 4A is a side sectional view of a fourth embodiment of the instrument, which is largely analogous to the third embodiment, but has flexible corrugations in one end portion of the encapsulation;

FIG. 4B is a top sectional view of the FIG. 4A instrument;

FIG. 4C is a plan view of an end portion of the FIG. 4A instrument;

DETAILED DESCRIPTION OF THE PREFERRED EMBODIMENTS

Figure 2A:
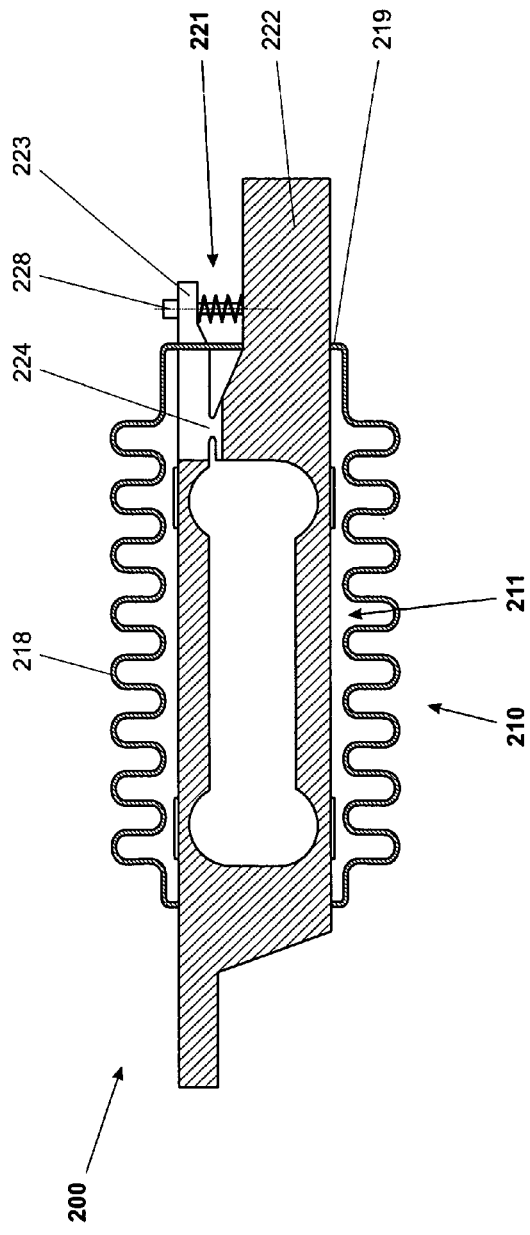
FIG. 2A is a side sectional view of a second embodiment of the instrument, with an adjustment region that allows an eccentric load error adjustment in the lengthwise direction and in the transverse direction.

FIG. 1A shows a gravimetric measuring instrument 100 in a sectional view from the side, in a first embodiment. The gravimetric measuring instrument 100 includes a weighing cell 110, a circuit module 130, a processor module 140, and an input/output unit 150. The weighing cell 110 has a parallel-guiding mechanism 111 whose stationary parallelogram leg 114 is mounted by way of a support 198 on solid ground 199. The weighing cell 110 further includes a movable parallelogram leg 115 which is connected to a load receiver 197, for example to a weighing pan. The movable parallelogram leg 115 is guided in vertical movement and connected to the stationary parallelogram leg 114 by means of an upper parallel-guiding member 113 and a lower parallel-guiding member 112. Flexure pivots 116 are formed in the connecting zones between the parallel-guiding members 112, 113 and the parallelogram legs 114, 115. A measurement transducer, more specifically a strain gauge 117 is arranged in each of the connecting zones, i.e. on each of the flexure pivots 116. Of course, there can also be other measurement transducers arranged between the stationary parallelogram leg 114 and the movable parallelogram leg, such as for example an electromagnetic measurement transducer or an oscillating string transducer. The specific design possibilities for a parallel-guiding system with these types of measurement transducers are known in the state of the art and are therefore not described in detail.

Part of the parallel-guiding mechanism 111 is enclosed and sealed off from the outside by a tubular-shaped encapsulation 118 whose mid-portion is configured as a bellows. The encapsulation 118 further has two end portions 119, 120, with the first end portion 119 being connected to a flange formed on the stationary parallelogram leg 114 and the second end portion 120 being connected to a flange formed on the movable parallelogram leg 115. The encapsulation 118 can for example be screwed, adhesively bonded, welded or pressure-bonded to these flanges, so as to form a gas-tight seal.

There is further an adjustment region 121 formed on the stationary parallelogram leg 114. The adjustment region includes a first lever 122 and a second lever 123 which are connected to each other by means of a deformation zone 124. The deformation zone 124 is formed by a first cutout 125 and a second cutout 126 which traverse the stationary parallelogram leg 114 in the horizontal direction. With the deformation zone 124, a horizontal pivot axis D is defined, as indicated in FIG. 1B, about which axis D the two levers 122, 123 can be pivoted relative to each other. The first lever 122 includes the connector portion to the support 198. Accordingly, the first lever 122 takes up the reaction forces when an adjusting force or an adjusting torque is applied to the second lever 123. When the second lever 123 is displaced in a pivoting or tilting movement relative to the first lever 122, the flexure pivot 116 adjoining the second lever 123 is adjusted up or down in the vertical displacement direction V, so that the distance between the upper flexure pivot 116 and the lower flexure pivot 116 can be adjusted.

The two levers 122, 123 are configured in such a way that their first lever sections which are formed by the first cutout 125 are arranged inside the encapsulation 118 and their second lever sections which are formed by the second cutout 126 are arranged outside of the encapsulation 118. Accordingly, the second lever sections are an essential part of an adjustment-setting area 127 which is arranged outside of the encapsulation 118 and thus accessible from the outside of the gravimetric measuring instrument. To allow a fine adjustment of the adjustment region 121, an adjustment screw 128 is arranged between the two levers 122, 123. This adjustment screw also secures the levers 122, 123 in one direction of angular displacement, while a compression spring 129 arranged between the levers 122, 123 secures them in the other direction of angular displacement, so that the adjustment position of the adjustment region 121 does not change during operation of the gravimetric measuring instrument 100.

FIG. 1B represents the gravimetric measuring instrument 100 of FIG. 1A in plan view, with only the encapsulation 118 shown in sectional view. The weighing cell 110 has only one adjustment screw 128, which makes it evident that in this embodiment only the eccentric load error in the lengthwise direction L of the weighing cell 110 can be adjusted, but that no eccentric load error adjustment is possible in the transverse direction Q.

As shown in FIGS. 1A and 1B, the deformation zone 124 is arranged in the plane of the first end portion 119. As a result of this, an adjustment of the eccentric load error causes only a sharp bending in the end portion 119, without an added compressing or stretching deformation.

As is evident from FIG. 1B, the strain gauges 117 are connected through connector leads to the circuit module 130. The circuit module 130 includes for example only a memory module and a converter circuit which serves to convert the analog signals produced by the strain gauges 117. The memory module and the converter circuit are connected through connector leads to the processor unit 140 which is arranged outside of the encapsulation 118. With this arrangement, the dissipated heat of a processor of the processor unit 140 can be kept out of the confined interior space which is hermetically sealed off from the outside by the encapsulation 118. As a result, a temperature rise in the interior space is largely avoided. Further, the memory module serves to store compensation data which can be called up by the processor unit 140 and by means of which the converted raw signal of the weighing cell 110 can be corrected. These compensation data are data which are specific to each individual weighing cell, which will necessarily vary from one cell to the next due to manufacturing tolerances and which are determined for each weighing cell 110 during the final inspection at the factory. Due to this design concept, an encapsulated weighing cell 110 can be exchanged without a problem, without the need to readjust the entire gravimetric measuring instrument 100. After the measuring signals have been processed in the processor unit 140, they are sent as weight values to the input/output unit 150. Of course, the processor unit 140 can also be arranged inside the encapsulation 118. Furthermore, the circuit module 130 and the processor unit 140 can also be mounted together on a circuit board and can be arranged either inside or outside the encapsulation 118.

In the drawing figures that follow, the circuit module which belongs to the gravimetric measuring instrument, the processor unit, the input unit and the output unit are not illustrated and described again. Likewise, the load receiver on the movable parallelogram leg and the ground support of the stationary parallelogram leg are not illustrated and described again in the following figures.

Figure 2B:
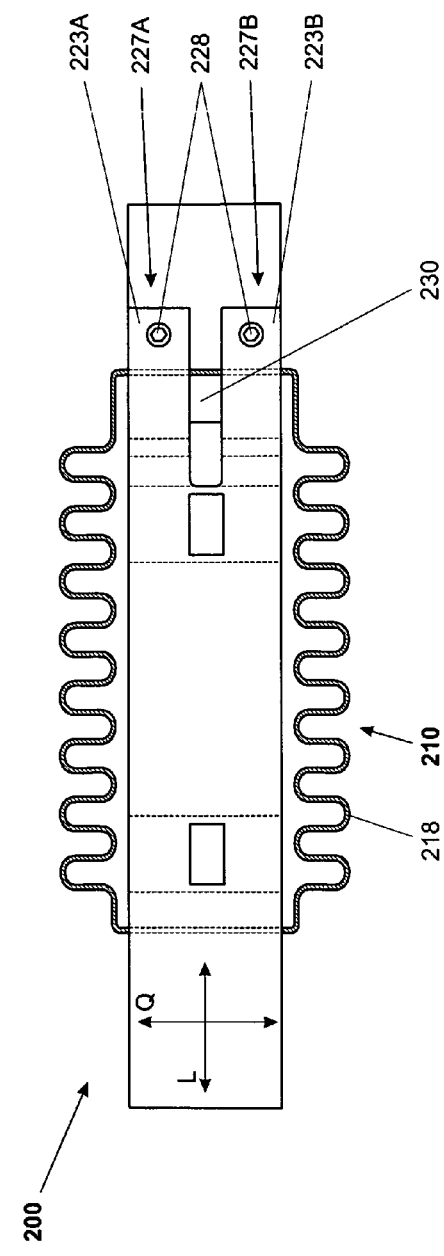
FIG. 2B is a top sectional view of the FIG. 2A instrument.

FIG. 2A shows a gravimetric measuring instrument 200 in a sectional view from the side, and FIG. 2B shows the same measuring instrument 200 seen from above with only the encapsulation 218 drawn in a sectional view. Except for the adjustment region 221 of the parallel-guiding system 211, the weighing cell 210 of this embodiment does not differ from the first embodiment described in FIGS. 1A and 1B. The adjustment region 221 is distinguished from the adjustment region described above by being divided into two adjustment regions lying side-by-side, whereby an eccentric load adjustment in the lengthwise direction L and in the transverse direction Q is made possible. As shown in FIGS. 2A and 2B, this can be achieved through the concept that the second lever 223 and the deformation zone 224 are split in the lengthwise direction of the weighing cell 210 into a right lever 223A and a left lever 223B by means of a lengthwise cut 230.

A parallel adjustment, i.e. a pivoting movement of equal magnitude and equal direction, of the right lever 223A and the left lever 223B will affect primarily the eccentric load error in the lengthwise direction L of the parallel-guiding mechanism 211, while an anti-parallel adjustment, i.e. a pivoting movement of equal magnitude but opposite direction, of the two levers 223A and 223B will affect primarily the eccentric load error in the transverse direction Q of the parallel-guiding mechanism 211. However, there can be some cross-over effect between the two directions, so that a parallel adjustment can also to a minor extent affect the eccentric load error in the transverse direction Q and an anti-parallel adjustment can also to a minor extent affect the eccentric load error in the lengthwise direction L. Of course, each of the two adjustment regions has its own adjustment-setting area 227A and 227B, respectively, with an adjustment screw 228.

As can be seen in FIGS. 2A and 2B, the deformation zone 224 is not located in the plane of the first end portion 219 of the encapsulation 218, but rather inside the encapsulation 218. Consequently, the encapsulation 218 has three perforations in its end portion 219, through which the right lever 223A, the left lever 223B and the first lever 222 pass to the outside. In the process of adjusting the eccentric load error, the encapsulation 218 in the area of the first end portion 219 is subjected to sharp bending, compressing and/or stretching. Consequently, this area of the encapsulation 218 needs to have a high degree of elasticity and flexibility. This part of the encapsulation 218 is therefore preferably made of rubber or a soft elastic synthetic material. This implies that the encapsulation 218 does not need to be made of a single piece, but can have a plurality of components that consist of different materials.

In FIG. 3A, a gravimetric measuring instrument 300 in a third embodiment is shown in a sectional view, seen from the side. FIG. 3B shows the gravimetric measuring instrument 300 of FIG. 3A in a view from above, wherein only the encapsulation 318 is illustrated in sectional view. The following description applies to both drawing figures.

The third embodiment of a gravimetric measuring instrument 300 according to the disclosed embodiments includes a weighing cell 310 whose parallel-guiding mechanism 311 again differs from the previously described embodiments in the configuration of the adjustment region 327 and the flexure pivots 316 of the parallel-guiding mechanism 311. The flexure pivots 316 are divided by means of vertical perforations 330, 331. As the flexure pivots are divided, the weighing cell 311 has a total of eight strain gauges 317. Furthermore, of the stationary parallelogram leg 314, only the first lever 322 protrudes beyond the first end portion 319 of the encapsulation 318. The second lever 323 is divided into a right lever 323A and a left lever 323B by the extension of the perforation 311 up to the end portion 319. Each of the levers 323A, 323B has a blind bore hole for the engagement of an adjustment tool, which is not shown here. The flanges which are formed on the stationary parallelogram leg 314 and on the movable parallelogram leg 315 are likewise part of the encapsulation 318 as they form, respectively, a part of the first end portion 319 and a part of the second end portion 320. As illustrated in FIGS. 1A and 1B, the deformation zone 324 is located in the plane of the first end portion 319. As a result, in the adjustment process for the eccentric load error, the end portion 319 is only bent and warped, without being additionally subjected to compressing or stretching as in FIGS. 2A and 2B. Thus, the adjustment-setting area 327 is formed in the stationary parallelogram leg 314 and in the end portion 319 of the encapsulation 318.

In FIG. 4A, a gravimetric measuring instrument 400 in a fourth embodiment is shown in a sectional view, seen from the side. FIG. 4B shows the gravimetric measuring instrument 400 of FIG. 4A in a view from above, and FIG. 4C shows a direct view of an end portion of the gravimetric measuring instrument 400 of FIGS. 4A and 4B. The following description applies to all three of the drawing figures.

The gravimetric measuring instrument 400 shown in FIGS. 4A-C is largely analogous to the third embodiment and therefore does not require a complete description. The only difference is that the end portion 419 of the encapsulation 418 has a flexible corrugation 435. Due to the flexible corrugation 435, the parallel-guiding mechanism 411 can be adjusted with a significantly smaller effort, because the folds of the flexible corrugation make it easier to deform the material of the encapsulation 418. This concept further allows a reduction of the material stresses in the encapsulation 418, which can relax during operation of the gravimetric measuring instrument 400 and thereby affect the weighing result. In addition, the deformations occurring as a result of the adjustment process are largely confined to the flexible corrugation 435. At the same time, the flexible corrugation 435 stiffens the end portion 419. By using this design feature, impact forces which could hit the encapsulation 418 during operation of the gravimetric measuring instrument 400 can be isolated from the adjustment region 421, so that the adjusted position of the flexure pivots 416 is not changed as a result of the impact forces.

Figure 5A:
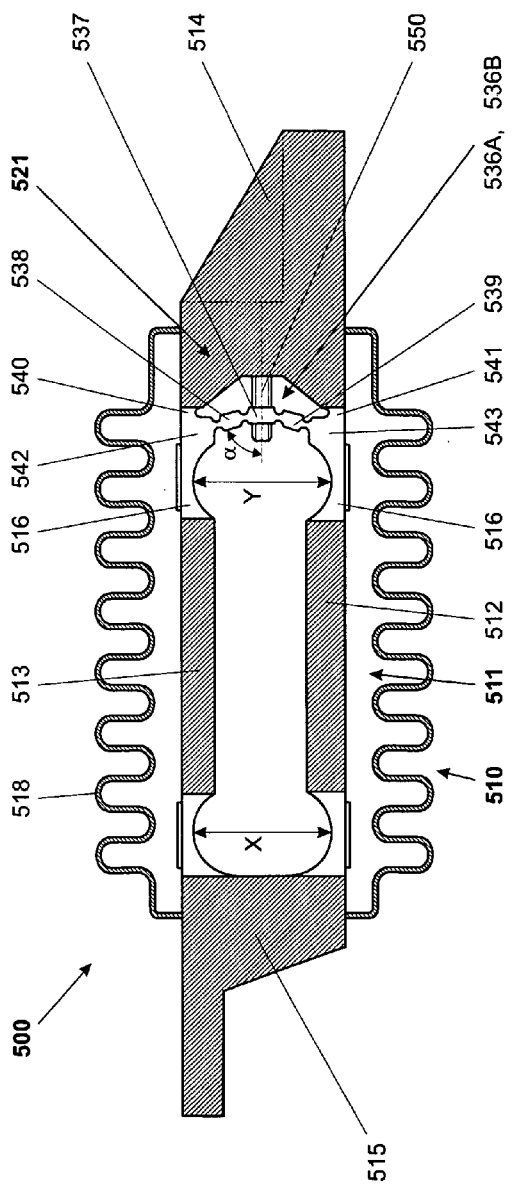
FIG. 5A is a side sectional view of a fifth embodiment instrument, which has an adjustment region with two knee levers.
Figure 5B:
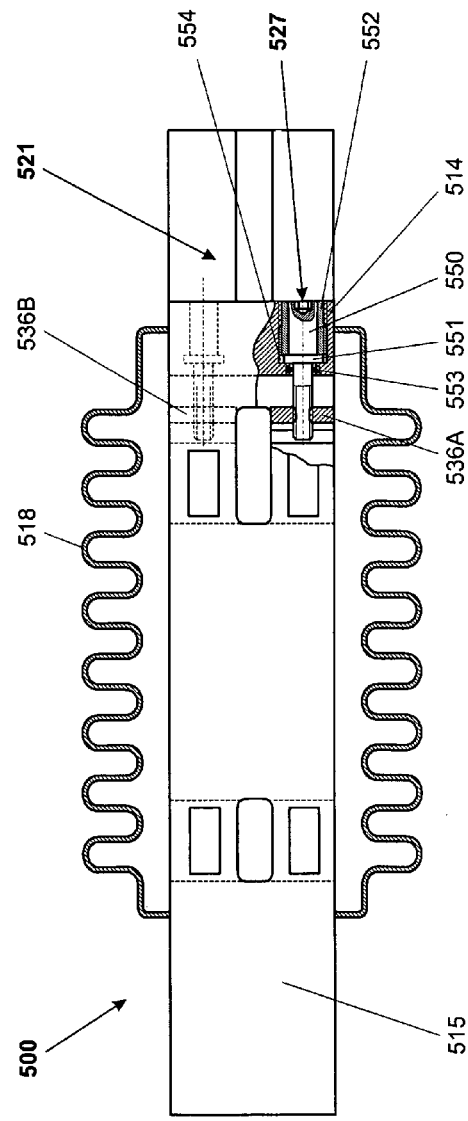
FIG. 5B is a top sectional view of the FIG. 5A instrument.

The gravimetric measuring instrument 500 shown in FIGS. 5A and 5B is largely analogous to the preceding embodiments with divided flexure pivots and therefore does not require a complete description. However, there is a significant difference in the configuration of the adjustment region 521 of the weighing cell 510. The latter has two knee levers 536A and 536B. Each of the knee levers 536A, 536B includes a knee joint 537 which pivotally connects an upper knee lever member 538 and a lower knee lever member 539 to each other. The flexure pivot 516 of the upper parallel-guiding member 513 does not directly adjoin the stationary parallelogram leg 514, but is connected to the latter by way of an upper intermediate portion 542 and an upper deformation zone 540. The same applies to the lower parallel-guiding member 512, whose flexure pivot 516 is connected to the stationary parallelogram leg 514 by way of a lower intermediate portion 543 and a lower deformation zone 541. The upper knee lever member 538 is pivotally connected to the upper intermediate portion 542, and the lower knee lever member 539 is pivotally connected to the lower intermediate portion 543. Due to the mobility that the afore-described parts of the adjustment region 521 have in relation to each other, the intermediate portions 542, 543 can be swiveled away from each other or towards each other. This angular displacement causes a change of the vertical distance Y between the flexure pivots 516 adjacent to the intermediate portions 542, 543. Since the zones of deformation 540, 541 are arranged inside the encapsulation 518 an adjustment does not cause a deformation of the encapsulation 518. Also, there is no concern about any reactive forces and stresses being transmitted from the encapsulation 518 to the adjustment region 521.

In order to effect a linear displacement of the knee joint 537, transmitting elements 550 need to be arranged between the adjustment-setting area 527 which is located outside the encapsulation 518 and each of the knee levers 535A, 536B. A possible design for a transmitting element 550 is illustrated in detail in FIG. 5B.

The transmitting element 550 has a threaded element comparable to a spindle drive which is engaged in a female thread formed in the knee joint 537. The transmitting element 550 is supported—with the freedom to rotate when in its unsecured condition—in a bore hole 554 which is formed in the stationary parallelogram leg 514. The ring-shaped collar 551 on the transmitting element 550 serves to constrain the latter in the lengthwise direction relative to the stationary parallelogram leg 514. Inside the bore hole 554, the side of the collar 551 that faces towards the movable parallelogram leg rests against the stationary parallelogram leg 514. The side of the collar 551 that faces away from the movable parallelogram leg 515 rests against the end surface of a threaded sleeve 552 which can be screwed into the bore hole 554. By means of the threaded sleeve 552, the collar 551 can be clamped down, whereby the transmitting element 550 can be locked in the bore hole 554 and secured against turning. In addition, a seal 553 prevents dirt and moisture from getting through the bore hole 554 into the interior space of the encapsulation 518.

With the geometrical relationships of the knee levers 536A and 536B in FIG. 5A, the parallel-guiding system can be adjusted with extraordinary accuracy. Due to the large angle a between the knee lever members 538, 539 and the lengthwise direction of the weighing cell 510, a very large reduction ratio is achieved, so that a considerable linear displacement of the knee joint 537 is necessary to produce a pivoting movement of the intermediate portions 542, 543.

To facilitate the adjustment process, the distance Y between the flexure pivots 516 of the stationary parallelogram leg 514 in the non-adjusted state is preferably designed to be larger than the distance X between the flexure pivots 516 of the movable parallelogram leg 515. While this makes it necessary to always perform an adjustment, it has the advantage that the direction of turning the adjustment-setting area 527 is predefined. As the distance Y always needs to be reduced, the knee joint 537 has to be pulled towards the stationary parallelogram leg 514, so that the side of the collar 551 that faces towards the knee joint 537 always rests against the parallelogram leg 514. Thus, no further displacement of the knee joint 537 occurs when the adjustment is subsequently secured by tightening the threaded sleeve 552.

Figure 6:
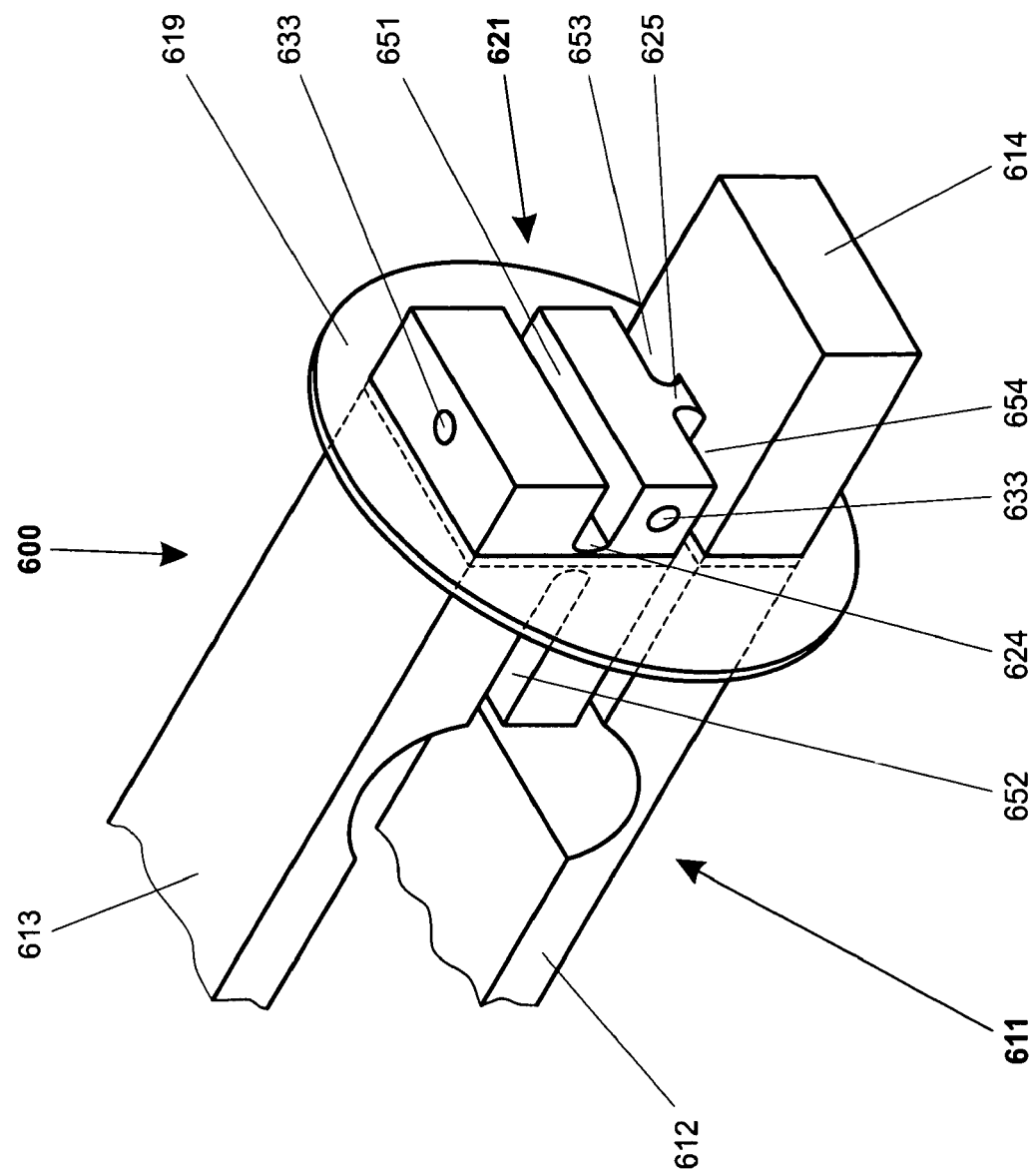
FIG. 6 is a perspective view of the part that is equipped with an adjustment region in a gravimetric measuring instrument according to a sixth embodiment.

FIG. 6 represents a three-dimensional view of a portion of a gravimetric measuring instrument 600 in a sixth embodiment. The gravimetric measuring instrument 600 has a parallel-guiding mechanism 611 whose stationary parallelogram leg 614 includes an adjustment region 621. The stationary parallelogram leg 614 has a first deformation zone 624 which is formed by two lengthwise cutouts 651 and 652, analogous to the deformation zone shown in FIG. 1. Accordingly, the horizontal pivot axis of the first deformation zone 624 is oriented at a right angle to the lengthwise direction of the parallel-guiding mechanism 611. Below this first deformation zone 624, a second deformation zone 625 is formed by means of two transverse cutouts 653, 654. The horizontal pivot axis of the second deformation zone is oriented in the lengthwise direction of the parallel-guiding mechanism, which makes it possible to twist the upper parallel-guiding member 613 in relation to the lower parallel-guiding member 612.

For a clearer view, only the first end portion 619 of the encapsulation is shown in the drawing. The end portion 619 is preferably made of a highly elastic material such as for example rubber or a synthetic material, as individual areas of the end portion 619 are either stretched or compressed in the process of an eccentric load adjustment. However, with several flexible corrugations or folds, even an end portion 619 made of metal could be made sufficiently pliable. In order to provide a hold for an adjustment tool (not shown), the stationary parallelogram leg 614 has blind holes 633 in the appropriate places.

Although the invention has been described by presenting specific examples of embodiments, it is considered obvious that numerous further variant embodiments could be created from a knowledge of the present invention, for example by combining features of the individual embodiments with each other or by exchanging individual functional units of the embodiments. As an example, the knee lever shown in FIG. 5 could also be replaced by a wedge. Furthermore, additional embodiments of an encapsulated parallel-guiding system according to the invention with an adjustment-setting area outside the encapsulation are possible, in particular with regard to the design of knee levers and the design of encapsulations. Also, parallel-guiding mechanisms of the type shown in the drawings need not necessarily be of monolithic construction, but could also consist of many different components. Furthermore, the most diverse materials or material combinations are conceivable, as well as different designs of the transmitting element. Of course, the adjustment region can also be formed on the movable parallelogram leg or even on both parallelogram legs.

What is claimed is:

1. A gravimetric measuring instrument, comprising:
a weighing cell, comprising:
   a parallel-guiding mechanism, which includes a movable parallelogram leg, a stationary parallelogram leg, and upper and lower parallel-guiding members, each of the parallel-guiding members joined to each of the parallelogram legs at a flexure pivot, so that the parallel-guiding members guide vertical movement of the movable parallelogram leg and connect the respective parallelogram legs; and
   a measurement transducer;
a flexible tubular-shaped encapsulation, one end of which is attached to the stationary parallelogram leg and the other end of which is attached to the movable parallelogram leg, so that at least the parallel-guiding mechanism and the measurement transducer are enclosed by the encapsulation and thereby protected against dirt and humidity;
an adjustment region, formed at at least one of the respective parallelogram legs, the adjustment region allowing adjustment of a distance between at least one of the flexure pivots of the upper parallel-guiding member and one of the flexure pivots of the lower parallel-guiding member, and
an adjustment-setting area, arranged outside the encapsulation and mechanically connected to the adjustment region, to allow changes to be made thereto.

2. The instrument of claim 1, further comprising:
a deformation zone in the adjustment region, constituted by at least one cutout that horizontally traverses the parallelogram leg on which the adjustment region is situated, the deformation zone also defining a pivot axis, such that:
   upon applying a force or a torque, the adjustment region tilts about the pivot axis, which is oriented in a transverse direction of the parallel-guiding mechanism; and,
   as a result of the tilting, the end of the parallel-guiding member that terminates in the adjustment region is permanently displaced in a vertical direction, correcting an eccentric load error in a lengthwise direction of the parallel-guiding mechanism.

3. The instrument of claim 2, wherein:
applying an adjusting force or adjusting torque to the adjustment-setting area subjects the deformation zone to a controlled plastic deformation; and
a targeted permanent position-adjustment of the parallel-guiding members relative to each other is accomplished through the controlled plastic deformation.

4. The instrument of claim 3, further comprising:
an additional cutout that splits the adjustment region at the vertically adjustable end of the parallel-guiding member that terminates in the adjustment region, the additional cutout running in a vertical lengthwise median plane of one of the parallelogram legs and extending up to the flexure pivot, forming two separate adjustment regions with separate deformation zones that are adjacent to each other, so that:
   when parallel forces or torques are applied to the two adjacent separate adjustment regions and parallel tilt displacements are imparted thereby, a permanent parallel vertical adjustment of the flexure pivot occurs, correcting an eccentric load error in the lengthwise direction of the parallel-guiding mechanism, and
   when anti-parallel forces or torques are applied to the two adjacent separate adjustment regions and opposite tilt displacements are imparted thereby, a permanent twisting distortion of the adjustable end of the parallel-guiding member occurs, correcting an eccentric load error in the transverse direction of the parallel-guiding mechanism.

5. The instrument of claim 4, further comprising:
a perforation of the flexure pivot, or a continuation of the additional cutout up to the parallel-guiding member, at the vertically adjustable end of the parallel-guiding member that terminates in the adjustment region, resulting in two separate adjacent flexure pivots.

6. The instrument of claim 5, further comprising:
a knee lever comprising two knee lever members that are pivotally connected at one end to each other through a knee joint, with the other end of each knee lever member located near the flexure pivots and pivotally connected to the parallelogram leg that includes the adjustment region of which the knee lever is a part, and
a transmitting element, through which the adjustment-setting area is connected to the knee joint.

7. The instrument of claim 6, wherein:
the distance between the flexure pivots of one of the parallelogram legs, in the non-adjusted state, is larger than the distance between the flexure pivots of the other parallelogram leg.

8. The instrument of claim 7, wherein:
the adjustment-setting area comprises one of:
- a blind hole for engaging an adjustment tool;
- a suitable surface formation for engaging a screw driver or wrench;
- an adjustment screw, or
- an adjustment wedge.

9. The instrument of claim 1, wherein:
the flexible tubular-shaped encapsulation comprises:
- a first end portion, with a gas-tight connection between the first end portion and the movable parallelogram leg;
- a second end portion, with a gas-tight connection between the second end portion and the stationary parallelogram leg; and
- a tubular-shaped mid-portion, with a gas-tight connection between the mid-portion and the respective end portions.

10. The instrument of claim 9, wherein:
the deformation zone is located in a plane which contains one of the encapsulation end portions.

11. The instrument of claim 9, wherein:
at least one of the end portions comprises a flexible corrugation.

12. The instrument of claim 1, wherein:
the encapsulation comprises rubber, synthetic material, or stainless steel.

13. The instrument of claim 1, wherein:
the encapsulation comprises a mid-portion configured in the form of a bellows.

14. The instrument of claim 2, further comprising:
an additional cutout that splits the adjustment region at the vertically adjustable end of the parallel-guiding member that terminates in the adjustment region, the additional cutout running in a vertical lengthwise median plane of one of the parallelogram legs and extending up to the flexure pivot, forming two separate adjustment regions with separate deformation zones that are adjacent to each other, so that:
- when parallel forces or torques are applied to the two adjacent separate adjustment regions and parallel tilt displacements are imparted thereby, a permanent parallel vertical adjustment of the elastic flexure pivot occurs, correcting an eccentric load error in the lengthwise direction of the parallel-guiding mechanism, and
- when anti-parallel forces or torques are applied to the two adjacent separate adjustment regions and opposite tilt displacements are imparted thereby, a permanent twisting distortion of the adjustable end of the parallel-guiding member occurs, correcting an eccentric load error in the transverse direction of the parallel-guiding mechanism.

15. The instrument of claim 4, further comprising:
a knee lever comprising two knee lever members that are pivotally connected at one end to each other through a knee joint, with the other end of each knee lever member located near the flexure pivots and pivotally connected to the parallelogram leg that includes the adjustment region of which the knee lever is a part, and
a transmitting element, through which the adjustment-setting area is connected to the knee joint.

16. The instrument of claim 1, wherein:
the distance between the flexure pivots of one of the parallelogram legs, in the non-adjusted state, is larger than the distance between the flexure pivots of the other parallelogram leg.

17. The instrument of claim 1, wherein:
the adjustment-setting area comprises one of:
- a blind hole for engaging an adjustment tool;
- a suitable surface formation for engaging a screw driver or wrench;
- an adjustment screw, or
- an adjustment wedge.

18. A gravimetric measuring instrument, comprising:
a weighing cell, comprising:
- a parallel-guiding mechanism, which includes a movable parallelogram leg, a stationary parallelogram leg, and upper and lower parallel-guiding members, each of the parallel-guiding members joined to each of the parallelogram legs at a flexure pivot, so that the parallel-guiding members guide vertical movement of the movable parallelogram leg and connect the respective parallelogram legs; and
- a measurement transducer;
- a flexible tubular-shaped encapsulation, enclosing at least the parallel-guiding mechanism and the measurement transducer, comprising:
  - a first end portion attached to the movable parallelogram leg and providing a gas-tight connection therebetween;
  - a second end portion attached to the stationary parallelogram leg and providing a gas-tight connection therebetween; and
  - a tubular-shaped mid-portion, providing a gas-tight connection between itself and each of the end portions;
  - wherein at least one of the end portions comprises a flexible corrugation;
an adjustment region, formed at at least one of the respective parallelogram legs, the adjustment region allowing adjustment of a distance between at least one of the flexure pivots of the upper parallel-guiding member and one of the flexure pivots of the lower parallel-guiding member, wherein the distance between the flexure pivots of one of the parallelogram legs, in a non-adjusted state, is larger than the distance between the flexure pivots of the other parallelogram leg; and
an adjustment-setting area, arranged outside the encapsulation and mechanically connected to the adjustment region, to allow changes to be made thereto.

* * * * *